United States Patent
Wilson

(10) Patent No.: US 8,544,812 B2
(45) Date of Patent: Oct. 1, 2013

(54) MOTORCYCLE RESTRAINT DEVICE

(76) Inventor: Clint Wilson, Union City, TN (US)

( * ) Notice: Subject to any disclaimer, the term of this patent is extended or adjusted under 35 U.S.C. 154(b) by 152 days.

(21) Appl. No.: 13/373,552

(22) Filed: Nov. 19, 2011

(65) Prior Publication Data

US 2012/0126086 A1    May 24, 2012

Related U.S. Application Data

(60) Provisional application No. 61/458,261, filed on Nov. 22, 2010.

(51) Int. Cl.
*B60P 3/06* (2006.01)

(52) U.S. Cl.
USPC ............. 248/503; 248/680; 224/449; 410/3

(58) Field of Classification Search
USPC .............. 248/500, 503, 673, 680, 681, 676, 248/678; 410/3; 224/412, 413, 441, 447, 224/449, 450, 451, 452, 454, 459
See application file for complete search history.

(56) References Cited

U.S. PATENT DOCUMENTS

| | | | | |
|---|---|---|---|---|
| 6,109,494 | A  * | 8/2000 | Pilmore | 224/547 |
| 7,198,443 | B2 * | 4/2007 | Macomber, III | 410/7 |
| 7,648,317 | B2 * | 1/2010 | Kobacker et al. | 410/3 |
| 7,651,304 | B1 * | 1/2010 | Godin et al. | 410/3 |
| 7,686,549 | B1 * | 3/2010 | Posey | 410/3 |

* cited by examiner

*Primary Examiner* — Steven Marsh

(57) ABSTRACT

A motorcycle restraint device is provided. The motorcycle restraint device comprises a base assembly, a catch assembly and a catch pin assembly. The base assembly comprises at least one base mounting box, at least one front ramp and at least one rear ramp. The catch assembly is mounted to a top portion of the base assembly comprising at least one catch arm, at least one catch arm keeper, at least one bolt traversing the base assembly, at least one front plate, at least one top plate located perpendicular to a front portion of the top plate, at least base side plates, at least two springs vertically mounted between at least one locking rod and at least one spring backup rod. The catch pin assembly is secured to a frame of a motorcycle.

13 Claims, 5 Drawing Sheets

MOTORCYCLE RESTRAINT DEVICE

CROSS-REFERENCE TO RELATED APPLICATIONS

This application claims prior to U.S. Provisional Application No. 61/458,261 filed Nov. 22, 2010, the contents of which are hereby incorporated in its entirety.

BACKGROUND OF THE INVENTION

The present invention relates to a motorcycle restraint device. More particularly, the present invention relates to a device for securing and restraining a motorcycle at a fixed position for storage or transportation.

Motorcycle restraint systems have relied on various means of halting movement of a motorcycle during transportation. For example, U.S. Pat. No. 7,232,281 describes a transport device that includes a docking bar receiver that is permanently attached to a motorcycle. The height of the vertical receiving member may restrict movement of the motorcycle over the device thus resulting in possible difficulty in maneuvering the motorcycle in place for securing. U.S. Pat. No. 7,287,942 describes a motorcycle restraint system utilizing a permanent trailing member linking the rear axle of the motorcycle to the floor of the transport vehicle via two hinge joints, allowing for automatic height adjustment. The restraint system allows the motorcycle to be transported without the use of tension straps, allowing both tires to rest on the floor of the transport vehicle against only the weight of the motorcycle. The arms of the trailing member, however, may be found unsightly and can possibly cause difficulty in maneuvering the motorcycle in tight quarters. The present restraint device overcomes the deficiencies of the aforementioned devices.

SUMMARY OF THE INVENTION

A motorcycle restraint device is provided. The motorcycle restraint device comprises a base assembly, a catch assembly and a catch pin assembly. The base assembly comprises at least one base mounting box, at least one front ramp and at least one rear ramp. The catch assembly is mounted to a top portion of the base assembly comprising at least one catch arm, at least one catch arm keeper, at least one bolt traversing the base assembly, at least one front plate, at least one top plate located perpendicular to a front portion of the top plate, at least two base side plates, at least two springs vertically mounted between at least one locking rod and at least one spring backup rod. The catch pin assembly is permanently or detachably secured to a bottom or front frame portion of a motorcycle.

A method of restraining a motorcycle in an upright position within the device of is also provided. According to the method, the user rolls the front tire onto the front ramp and over the catch assembly thereby placing the front tire onto a top surface of the rear ramp. Next, the catch pin assembly slidably engages catch arms.

BRIEF DESCRIPTION OF THE FIGURES

FIG. 5 is a perspective view of the motorcycle restraint device according to one embodiment.

DETAILED DESCRIPTION

The motorcycle restraint device is constructed to have an overall height capable of receiving at least one tire of a motorcycle. The overall profile allows at least one motorcycle tire to be easily moved over the catch assembly thus allowing for engagement of the catch pin assembly with the catch assembly.

In one embodiment, the base assembly, including all parts of the base assembly, comprises at least one material capable of supporting the weight of a motorcycle. In one embodiment, the base assembly, including all parts of the base assembly, comprises at least one metal or metal alloy. Preferably, the base assembly, including all parts of the base assembly, comprises aluminum. In one embodiment, the base assembly, including all parts of the base assembly, comprises a plastic, injection molded composite or high-density polymer.

Figure 1:
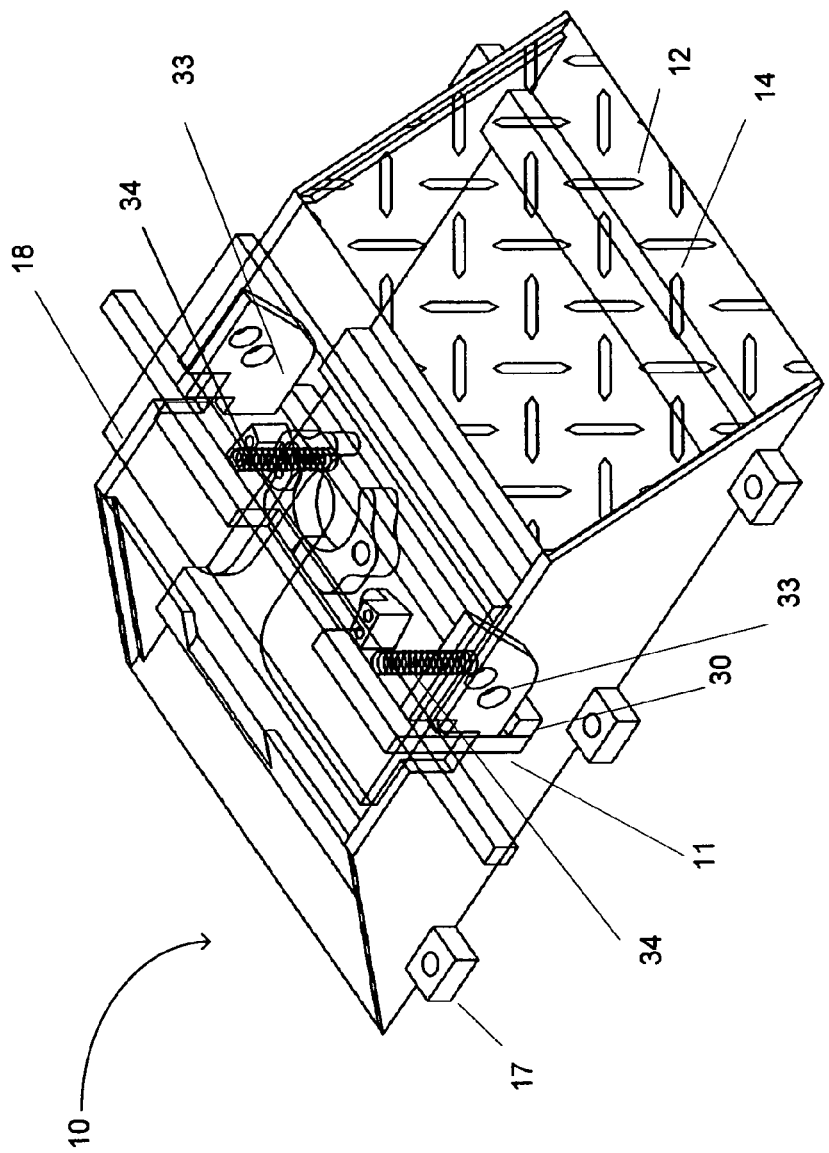
FIG. 1 is a perspective view of the motorcycle restraint device according to one embodiment.
Figure 3:
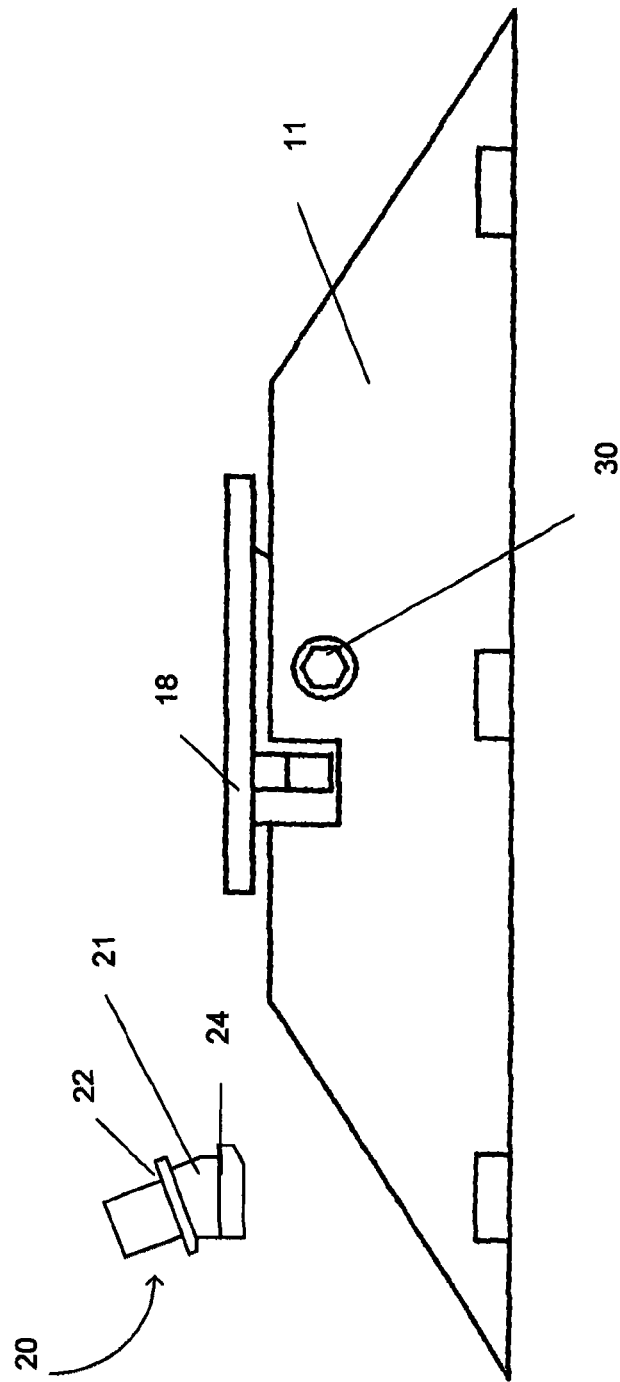
FIG. 3 is a side view of the motorcycle restraint device with the catch pin assembly.
Figure 4:
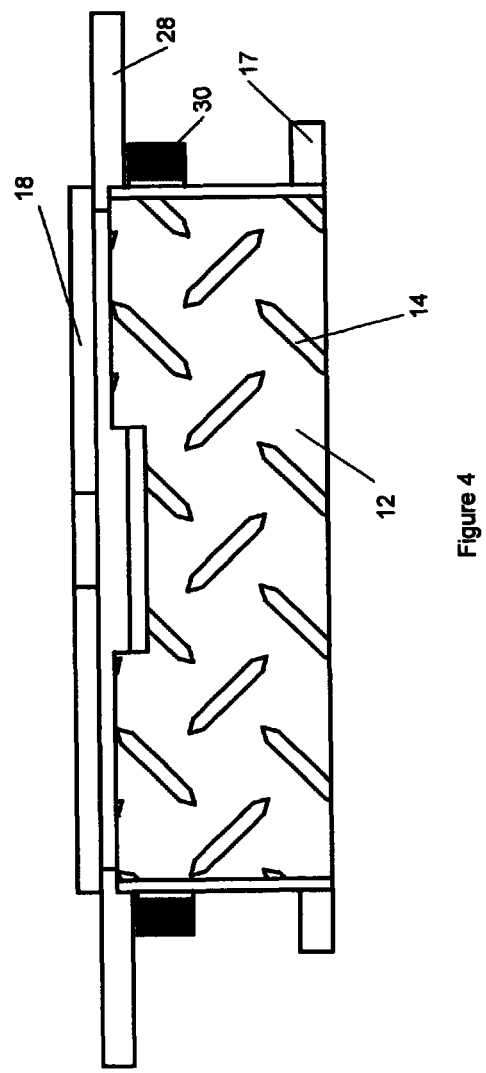
FIG. 4 is a front view of the motorcycle restraint device with the catch pin assembly.
Figure 6:
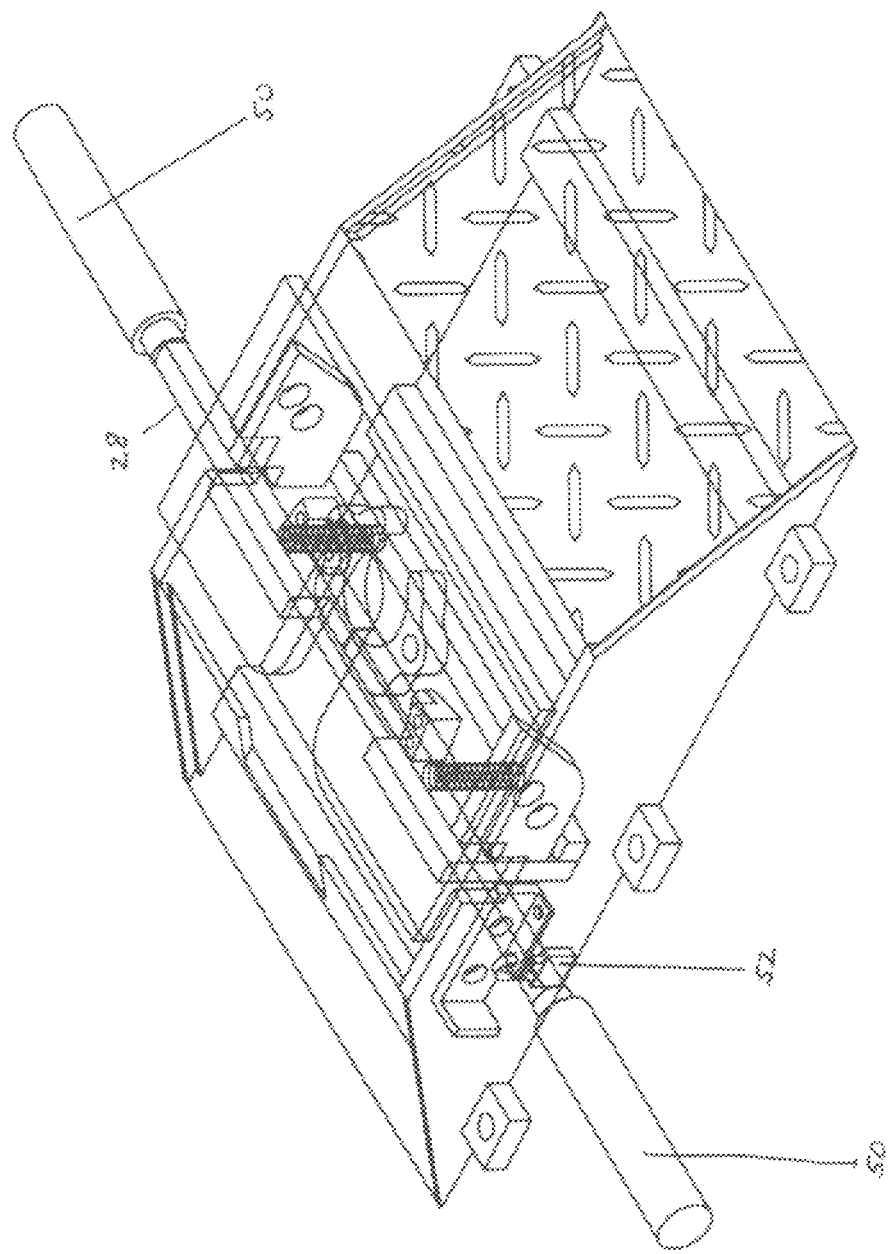

In the embodiment of the motorcycle restraint device 10 according to FIGS. 1, 3 and 4, the base assembly 11 comprises at least one front ramp 12. Preferably, the front ramp 12 comprises at least one tread 14 to prevent sliding of the motorcycle tire upon entry. In one embodiment, the base assembly 11 comprises at least one rear ramp 32. Preferably, the rear ramp 32 comprises at least one tread 14 to prevent sliding of the motorcycle tire upon entry or exit. The base assembly 11 comprises at least one base mounting box 17. In a preferred embodiment, the base assembly 11 comprises at least one mounting box 17 on each of four sides of the base assembly 11. In one embodiment, the at least one base mounting box 11 is capable of receiving at least one fastener (not shown) including, but not limited to, a screw, bracket or nail for securing the base assembly 11 to a planar surface. In one embodiment, the planar surface is a secure surface located in an environment for motorcycle storage. In one embodiment, the planar surface is a driveway, garage floor or floor of a trailer for transportation. In one embodiment, the base assembly 11 is easily portable such that the base assembly 11 may be removed, relocated and attached to another secure surface.

Figure 2:
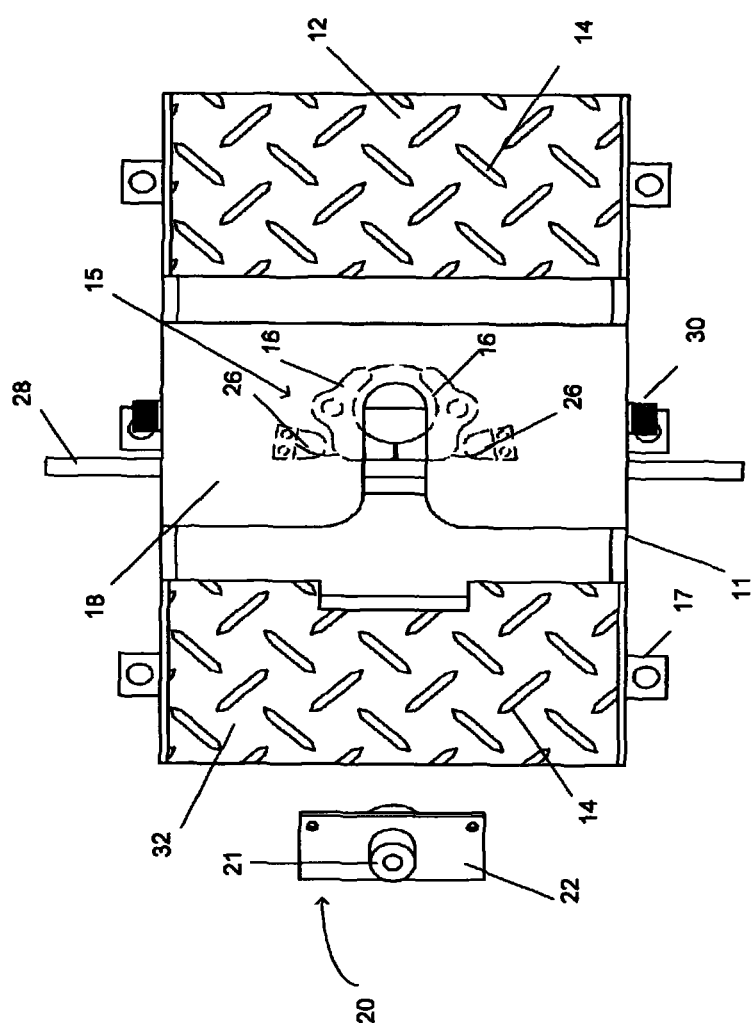
FIG. 2 is a top view of the motorcycle restraint device with the catch pin assembly.

As illustrated in FIG. 2, the motorcycle restraint device comprises a catch assembly 15. In one embodiment, the catch assembly 15 comprises at least two catch arms 16 located tangentially to each other under at least one catch assembly top plate 18. In one embodiment, the at least one top plate 18 forms a planar surface parallel to the secure surface and having an opening or recess capable of receiving a catch pin assembly 20. The catch arms 16 are capable or receiving the catch pin assembly 20. Preferably, a first collar 22 of the catch pin assembly 20 slidably moves over a top portion of the catch arms 16 while a second collar 24 of the catch pin assembly 20 slidably moves under a bottom portion of the catch arms 16. Upon entry of the catch pin assembly 20, the catch arms 16 lock the catch pin located on the motorcycle frame thereby securing the motorcycle in an upright orientation. In a preferred embodiment, the motorcycle is secured in a manner such that straps or cords are not required to assure a secure, upright orientation of the motorcycle.

As illustrated in FIG. 2, the catch assembly 15 comprises at least two catch arm keepers 26 corresponding to each of the catch arms 16. The catch arm keepers 26 are oriented such that the two catch arms 16 slidably engage the catch pin assembly 20 upon entry. The catch assembly 15 comprises at least one bolt 30 that runs perpendicular to and traverses the base assembly 11. In one embodiment, the bolt 30 is of a material, weight, and thickness to allow for proper support of the base assembly 11 when the weight of a motorcycle is applied. In a preferred embodiment, the bolt 30 is at least 5/8 inch in diameter. As illustrated in FIG. 1, the catch assembly 15 comprises at least two side plates 33 arranged beneath and perpendicular to two side portions the top plate 18.

As illustrated in FIGS. 1 and 2, the catch assembly 15 comprises at least one locking rod 28 traversely located beneath a front portion of the top plate 18. In one embodiment, the catch assembly 15 comprises at least two springs 34 vertically mounted between a top surface of the spring backup rod 30 and a bottom surface of locking rod 28. Preferably, the locking rod 28 is capable of moving from a first position wherein the catch pin assembly 20 engages the catch assembly 15 to a second position wherein the locking rod 28 secures the catch pin assembly 20 within the catch assembly 15 and recess of the top plate 18. Preferably, the spring backup rod 30 is stationary and permanently secured at each end to an inner face of the corresponding base side plates 11. The at least two springs 34 are of a strength and tension to move the locking rod 28 from a first position to a second position behind the catch pin assembly 20 once the catch pin assembly 20 engages the catch arms 16. In one embodiment, the springs 34 are at least two inches long.

As illustrated in FIGS. 2 and 3, a motorcycle to be restrained comprises a catch pin assembly 20. In one embodiment, the catch pin assembly 20 is comprised of any material capable of supporting the weight of a motorcycle. Suitable materials include, but are not limited to, metal, metal alloy, aluminum, plastic, injection molded composite or high-density polymer. Preferably, the catch pin assembly 20 is secured to the motorcycle frame. In a preferred embodiment, the catch pin assembly 20 is permanently secured to a front portion of the motorcycle frame directly behind the front tire. In an alternative embodiment, the catch pin assembly 20 is permanently secured to a bottom portion of the motorcycle frame directly behind the front tire. In one embodiment, the catch pin assembly 20 is detachably secured to the motorcycle frame. In all embodiments, the catch pin assembly 20 is located on the motorcycle frame such that the catch pin assembly 20 does not interfere with the operation of the motorcycle. In one embodiment, the catch pin assembly 20 comprises an elongated member 21 having at least one collar. Preferably, the catch pin assembly 20 comprises an elongated member 21 having a first collar 22 and a second collar 24. In one embodiment, the first collar 22 comprises at least one hole for securing the catch pin assembly 20 to the motorcycle frame. Preferably, the first collar 22 comprises at least two holes for securing the catch pin assembly 20 to the motorcycle frame. The catch pin assembly 20 can be secured to the motorcycle frame with at least one fastener including, but not limited to, a screw, bracket or nail. In one embodiment, the first collar 22 provides a surface for soldering the catch pin assembly 20 to the motorcycle frame. In one embodiment, the elongated member 21 is cylindrical in shape. Preferably, the elongated member 21 is cylindrical in shape and is angled to allow proper engagement of the catch pin assembly 20 with the catch assembly 15. The angle of the elongated member 21 can be adjusted to the angle of the motorcycle frame to assure proper engagement.

In the embodiment of FIG. 5, the locking rod 28 may include grips 50 allowing for easier movement by the end user. The device may also include a locking mechanism 52 thereby providing securing to a motorcycle engaged in the instant device. The locking mechanism 52 may be a keyed pad lock, combination lock, or any other locking means appreciated by one of ordinary skill.

In use, a user secures the base assembly to a secure surface. The user moves the motorcycle forward rolling the front tire onto the front ramp and over the catch assembly thereby placing the front tire onto a top surface of the rear ramp. During movement of the motorcycle's front tire onto the rear ramp, the catch pin assembly slidably engages the catch arms thereby securing the motorcycle. The motorcycle remains stationary until the user chooses to remove the motorcycle. When the user desires to remove the motorcycle from the restraint device, the user places her foot on at least one locking rod traversely located beneath a front portion of the top plate thereby moving the catch arms from a closed position to an open position and releasing the catch pin assembly secured to the motorcycle. In another embodiment, the user places both feet on each locking rod on each side of the restraint device thereby releasing the catch pin assembly secured to the motorcycle.

I claim:

1. A motorcycle restraint device comprising:
   a base assembly comprising at least one base mounting box, at least one front ramp and at least one rear ramp;
   a catch assembly mounted to a top portion of the base assembly comprising at least one catch arm, at least one catch arm keeper, at least one bolt traversing the base assembly, at least one front plate, at least one top plate located perpendicular to a front portion of the top plate, at least two base side plates, at least two springs vertically mounted between at least one locking rod and at least one spring backup rod; and
   a catch pin assembly, wherein the catch pin assembly is secured to a frame of a motorcycle.

2. The motorcycle restraint device of claim 1, wherein the base assembly, catch assembly and catch pin comprise at least one material capable of securing a motorcycle selected from the group consisting of metal, metal alloy, aluminum, plastic, injection molded composite and high-density polymer.

3. The motorcycle restraint device of claim 1, wherein the front ramp comprises at least one tread.

4. The motorcycle restraint device of claim 1, wherein the rear ramp comprises at least one tread.

5. The motorcycle restraint device of claim 1, wherein the base assembly comprises four base mounting boxes.

6. The motorcycle restraint device of claim 1, wherein the catch assembly comprises two catch arms capable of engaging an elongated member of the catch pin assembly.

7. The motorcycle restraint device of claim 1, wherein the catch assembly comprises two catch arm keepers.

8. The motorcycle restraint device of claim 1, wherein the catch assembly is capable of receiving the catch pin assembly.

9. The motorcycle restraint device of claim 1, wherein the catch pin assembly is permanently secured to a frame of a motorcycle.

10. The motorcycle restraint device of claim 1, wherein the catch pin assembly is detachably secured to a frame of a motorcycle.

11. The motorcycle restraint device of claim 9, wherein the catch pin assembly is located on a front portion of the frame behind a front wheel of the motorcycle.

12. The motorcycle restraint device of claim 9, wherein the catch pin assembly is located on a bottom portion of the frame behind a front wheel of the motorcycle.

13. A method of restraining a motorcycle in an upright position within the device of claim 1, comprising rolling a front tire onto the front ramp and over the catch assembly thereby placing the front tire onto a top surface of the rear ramp; and slidably engaging the catch pin assembly located on the motorcycle into the catch arms.

\* \* \* \* \*